(12) United States Patent
Nejatali et al.

(10) Patent No.: US 9,369,183 B2
(45) Date of Patent: Jun. 14, 2016

(54) SYSTEMS AND METHODS FOR MEASURING POWER AND IMPEDANCE IN WIRELESS POWER CHARGING SYSTEMS

(71) Applicant: QUALCOMM Incorporated, San Diego, CA (US)

(72) Inventors: Abdolhossein Nejatali, San Diego, CA (US); Francesco Carobolante, Carlsbad, CA (US); Ryan Tseng, Coronado, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/278,074

(22) Filed: May 15, 2014

(65) Prior Publication Data

US 2015/0333797 A1    Nov. 19, 2015

(51) Int. Cl.
*H04B 5/00* (2006.01)
*H04L 7/033* (2006.01)
*H04B 17/21* (2015.01)
*H04B 17/11* (2015.01)
*H02J 7/02* (2016.01)
*H02J 7/00* (2006.01)
*H02J 5/00* (2016.01)
*H02J 17/00* (2006.01)

(52) U.S. Cl.
CPC ............. *H04B 5/0037* (2013.01); *H04B 5/0043* (2013.01); *H04B 17/11* (2015.01); *H04B 17/21* (2015.01); *H04L 7/0332* (2013.01); *H02J 5/005* (2013.01); *H02J 7/0052* (2013.01); *H02J 7/025* (2013.01); *H02J 17/00* (2013.01)

(58) Field of Classification Search
CPC ......... H02J 7/025; H02J 5/005; H02J 7/0052; H02J 17/00; H02J 7/007; H04B 5/0037; H01F 38/14
See application file for complete search history.

(56) References Cited

U.S. PATENT DOCUMENTS

| 5,808,441 | A | 9/1998 | Nehring | |
|---|---|---|---|---|
| 7,476,233 | B1 | 1/2009 | Wiener et al. | |
| 7,605,496 | B2 | 10/2009 | Stevens et al. | |
| 2011/0278950 | A1* | 11/2011 | Baarman | 307/104 |
| 2012/0086282 | A1* | 4/2012 | Lee | 307/82 |
| 2012/0149303 | A1 | 6/2012 | Moes et al. | |
| 2012/0153894 | A1* | 6/2012 | Widmer | 320/108 |
| 2012/0175967 | A1 | 7/2012 | Dibben et al. | |

(Continued)

OTHER PUBLICATIONS

International Search Report and Written Opinion—PCT/US2015/030614—ISA/EPO—Jul. 30, 2015.

*Primary Examiner* — Ross Varndell
(74) *Attorney, Agent, or Firm* — Knobbe Martens Olson & Bear LLP (57) ABSTRACT

A wireless power transmitter may generate a magnetic field via a transmit antenna to induce voltage in a receive antenna of a wireless power receiver to power the unit and/or charge the receiver's battery. An apparatus for measuring wireless power transfer at an operating frequency between the transmitter and the receiver is provided. The apparatus comprises a first clock configured to generate a first clock signal at a first clock frequency that is higher than the operating frequency of the wireless power transfer. The apparatus further comprises a controller configured to operate based on a second clock signal, the first clock frequency higher than a second clock frequency of the second clock signal. The controller is further configured to measure an amount of wireless power transfer based on the first clock signal.

18 Claims, 6 Drawing Sheets

(56) References Cited

U.S. PATENT DOCUMENTS

2012/0223589 A1    9/2012   Low et al.
2012/0249197 A1   10/2012   Rehm
2013/0062961 A1*   3/2013   Park et al. .................... 307/104
2013/0088177 A1*   4/2013   Niizuma ............... H02P 27/085
                                                        318/139
2013/0188397 A1*   7/2013   Wu et al. ......................... 363/17
2013/0289662 A1   10/2013   Olson et al.
2013/0300206 A1*  11/2013   Kim et al. ..................... 307/104
2014/0028110 A1*   1/2014   Petersen et al. .............. 307/104
2014/0306673 A1*  10/2014   Le et al. ........................ 323/266
2014/0354066 A1*  12/2014   Watanabe et al. ............ 307/104

* cited by examiner

SYSTEMS AND METHODS FOR MEASURING POWER AND IMPEDANCE IN WIRELESS POWER CHARGING SYSTEMS

TECHNICAL FIELD

The described technology generally relates to wireless power. More specifically, the disclosure is directed to systems and methods for measuring power and impedance in wireless power charging systems.

BACKGROUND

Wireless power systems may include a power transfer unit (e.g., a charging device) and one or more power receive units (e.g., a cellphone, a laptop, etc.) to be charged. The power receive units may be configured to stop receiving power from the power transfer unit once they are charged. However, a non-compliant object present within a charging region of the power transfer unit may continue to receive power indefinitely. This situation presents a safety hazard because the non-compliant object may dissipate the power it receives as heat, causing damage or personal injury.

The power transfer unit may be configured to detect the presence of the non-compliant object based on an impedance shift caused by the non-compliant object. The power transfer unit may also detect the non-compliant object by comparing an amount of power transmitted to the power receive unit to an amount of power received by the power receive units. However, conventional power transfer units may not be configured to measure power and impedance with sufficient speed and accuracy to correctly detect the non-compliant object. Accordingly, there is a need for improved systems and methods for measuring power and impedance in wireless power charging systems

SUMMARY

An apparatus for measuring wireless power transfer at an operating frequency between a transmitter and a receiver is provided. The apparatus comprises a first clock configured to generate a first clock signal at a first clock frequency that is higher than the operating frequency of the wireless power transfer. The apparatus further comprises a controller configured to operate based on a second clock signal, the first clock frequency higher than a second clock frequency of the second clock signal. The controller is further configured to measure an amount of wireless power transfer based on the first clock signal.

A method for measuring wireless power transfer is also provided. The method comprising generating a first clock signal at a first clock frequency that is higher than, the operating frequency of the wireless power transfer. The method further comprises measuring by a controller an amount of wireless power transfer based on the first clock signal. The controller is configured to operate based on a second clock signal, the first clock frequency higher than a second clock frequency of the second clock.

An apparatus for measuring wireless power transfer at an operating frequency between a transmitter and a receiver is also provided. The apparatus comprises means for generating a first clock signal at a first clock frequency that is higher than the operating frequency of the wireless power transfer. The apparatus further comprises means for measuring an amount of wireless power transfer based on the first clock signal. The measuring means is configured to operate based on a second clock signal, the first clock frequency higher than a second clock frequency of the second clock.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of certain implementations of the invention and is not intended to represent the only implementations in which the invention may be practiced. The term "exemplary" used throughout this description means "serving as an example, instance, or illustration," and should not necessarily be construed as preferred or advantageous over other exemplary implementations. The detailed description includes specific details for the purpose of providing a thorough understanding of the disclosed embodiments. In some instances, some devices are shown in block diagram form.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving antenna" (or "receive antenna") to achieve power transfer.

Figure 1:
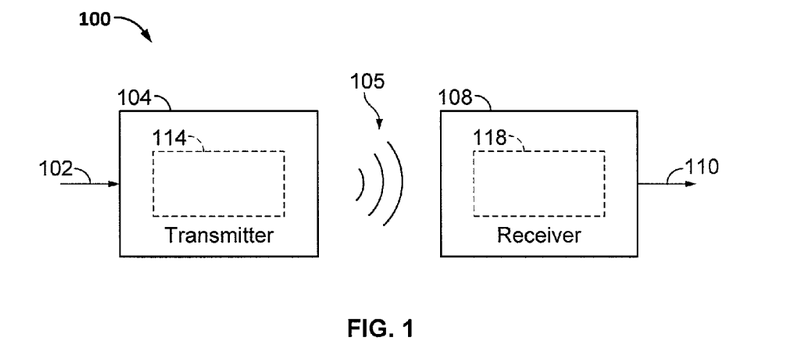
FIG. 1 is a functional block diagram of an exemplary wireless power transfer system, in accordance with exemplary embodiments of the invention.

FIG. 1 is a functional block diagram of an exemplary wireless power transfer system 100, which may be a loosely coupled wireless power system, in accordance with exemplary embodiments of the invention. An input power source 102 may be provided to a transmitter 104. The transmitter 104 may include a transmit antenna 114 configured to output an energy transmission to generate an energy field 105 (e.g. magnetic field).

A receiver 108 may include a receive antenna 118 configured to couple (e.g. by inductive coupling) to the energy field 105 and receive (i.e. capture) energy from the energy field 105. The receiver 108 may be configured to generate an output power source 110 based on the received energy. A region of the energy field 105 where the transmitter 104 may provide wireless power transfer to the receiver 108 may be referred to as a coupling mode region. A device (not shown) may be operably connected to the output power source 110 and may be configured to store or consume the power received.

In some embodiments, the energy field 105 may correspond to a "near-field" of the transmitter 104. The near-field may correspond to a region in which there may be strong reactive fields resulting from currents and charges of the transmit antenna 114 which radiate power away from the transmit antenna 114. In some cases the near-field may correspond to a region that is within about one wavelength (or a fraction thereof) of the transmit antenna 114. Energy transfer within the near-field may be more efficient than energy transfer outside of the near-field (i.e. far field).

In one exemplary embodiment, the transmitter 104 and the receiver 108 are configured according to a mutual resonant relationship where a resonant frequency of the receiver 108 and a resonant frequency of the transmitter 104 may be substantially the same or similar. In this configuration, a level of transmission loss between the transmitter 104 and the receiver 108 may be minimal and the receiver 108 may be configured to couple to the energy field 105 from a longer distance compared to non-mutual resonant configurations. As such, resonant coupling techniques may provide improved wireless power transfer efficiency across various distances and across a variety of transmitter and receiver configurations.

Figure 2:
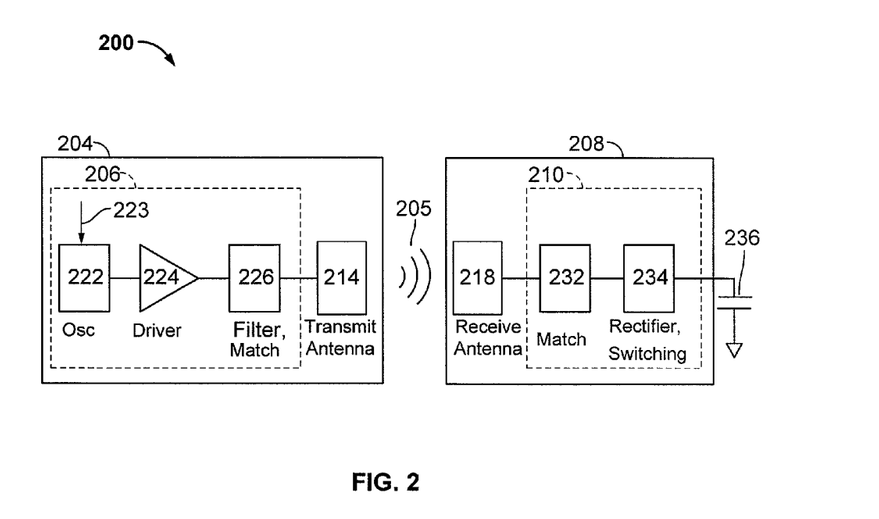
FIG. 2 is a functional block diagram of exemplary components that may be used in the wireless power transfer system of FIG. 1, in accordance with exemplary embodiments of the invention.

FIG. 2 is a functional block diagram of exemplary components that may be used in the wireless power transfer system 100 of FIG. 1, in accordance with various exemplary embodiments of the invention. The wireless power transfer system 100 may include a transmitter 204 and a receiver 208. The transmitter 204 and the receiver 208 may be configured as the transmitter 104 and the receiver 108 respectively, as described above in reference to FIG. 1. The transmitter 204 may include transmit circuitry 206 operably connected to a transmit antenna 214. The transmit circuitry 206 may include an oscillator 222, a driver circuit 224, and a filter and matching circuit 226.

The oscillator 222 may be configured to generate an oscillating square wave signal at a desired operating frequency, for example 468.75 KHz, 6.78 MHz or 13.56 MHz. The oscillating signal may be adjusted in response to a frequency control signal 223. The driver circuit 224 may be operably connected to the oscillator 222. The driver circuit 224 may be configured to receive the square wave signal from the oscillator 222 and output a sine wave. The driver circuit 224 may be configured to drive the transmit antenna 214 at, for example, a resonant frequency of the transmit antenna 214. In some embodiments, the driver circuit 224 may be a switching amplifier, for example, a class E amplifier. The filter and matching circuit 226 may be operably connected to the driver circuit 224 and the transmit antenna 214. The filter and matching circuit 226 may be configured to filter harmonics or other unwanted frequencies and to match an impedance of the transmit circuitry 206 with an impedance of the transmit antenna 214.

The transmit antenna 214 may be configured as the transmit antenna 114 as described above in reference to FIG. 1. The transmitter 204 may be configured to generate an energy field 205 (e.g. a time varying magnetic field) via the transmit antenna 214. In some embodiments, the transmitter 204 may be configured to generate the energy field 205 at a frequency corresponding to a resonant frequency of the transmit antenna 214 as described above. The transmit antenna 214 may be configured to wirelessly output power at a level sufficient to charge or power a load of an electronic device (e.g. the receiver 208). The power output may be, for example, on the order of 300 milliWatts to 20 Watts based on a required power level to power or charge different devices with different power requirements. In some embodiments, higher or lower power levels may also be provided.

The receiver 208 may include a receive antenna 218 operably connected to receive circuitry 210. The receive antenna 218 may be configured as the receive antenna 118 as described above in reference to FIG. 1. In some exemplary embodiments, the receiver 208 may be positioned to receive power from the energy field 205 (e.g. time varying magnetic field) and may be configured to induce a current in the receive antenna 218. As described above, the receive antenna 218 and the transmit antenna 204 may be configured to resonate at substantially the same frequency which may provide for efficient wireless power transfer. The receive antenna 218 may be configured to induce an alternating current (AC) signal of the time varying magnetic field.

The receive circuitry 210 may include a matching circuit 232 and a rectifier and switching circuit 234 operably connected to the receive antenna 218. The matching circuit 232 may be configured to match an impedance of the receive circuitry 210 to an impedance of the receive antenna 218. The rectifier and switching circuit 234 may be operably connected to the matching circuit 232. The rectifier and switching circuit 234 may be configured to receive the AC signal induced by the receive antenna 214 via the matching circuit 232 and generate a DC power output. In some embodiments the rectifier and switching circuitry may be operably connected to a battery 236 and the DC power output may be sufficient to charge the battery 236. In other embodiments the DC power output may power a device (not shown) that may be coupled to the receiver 208.

The receiver 208 may be configured to selectively disable the battery 236 (i.e. the load). The receiver 208 may be further configured to determine whether an amount of power received from the transmitter 204 is sufficient to charge the battery 236 and to enable the battery 236 upon that determination. In some embodiments, the receiver 208 may be configured to directly utilize power received from a wireless power transfer field without charging of the battery 236.

Figure 3:
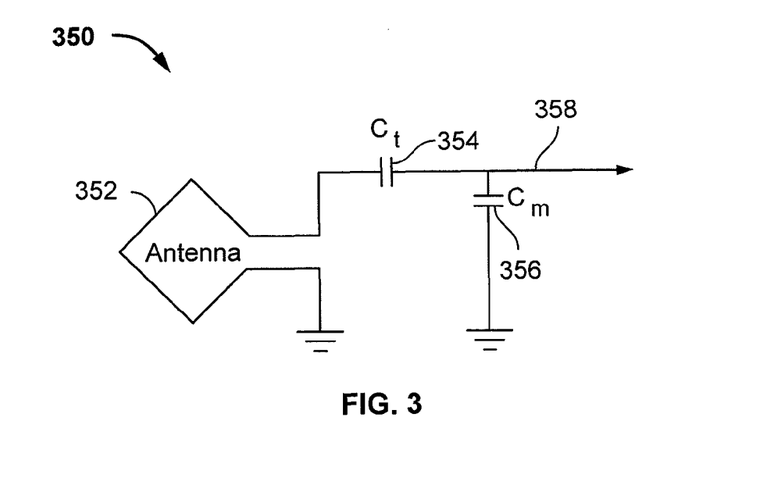
FIG. 3 is a schematic diagram of a resonant circuit that may be implemented in the transmitter or the receiver of FIG. 2, in accordance with exemplary embodiments of the invention.

FIG. 3 is a schematic diagram of a resonant circuit 350 that may be implemented in the transmitter 204 or the receiver 208 of FIG. 2, in accordance with exemplary embodiments of the invention. The resonant circuit 350 may include an antenna 352. In some embodiments the antenna 352 may be a coil (e.g., an induction coil). In other embodiments the antenna 352 may be an RF antenna. The antenna 352 may be implemented with a Litz wire or as an antenna strip designed for low resistance. The antenna 352 may not need "turns" to be of a practical dimension. An exemplary implementation of the antenna 352 may be "electrically small" (e.g., a fraction of the wavelength) and tuned to resonate at a usable low frequency by using capacitors to define the resonant frequency.

In some embodiments, the antenna 352 may be configured as a "loop" antenna or coil. The antenna 352 may be configured to include an air core or a physical core such as a ferrite core (not shown). In some embodiments, the antenna 352 may be an air core loop antenna. In this configuration, the antenna 352 may be more tolerant to extraneous physical devices placed in the vicinity of the antenna compared to a physical core antenna configuration. The air core configuration may also provide for placement of other components within the air core area. Also, this configuration may enable placement of the receive antenna 218 (FIG. 2) within a plane of the transmit antenna 214 (FIG. 2) where the coupled-mode region of the transmit antenna 214 (FIG. 2) may provide more efficient power transfer.

As stated above, an efficient transfer of energy between the transmitter 204 and the receiver 208 may occur during matched or nearly matched resonance between the transmit antenna 214 and the receive antenna 218. However, energy may be transferred at a lower efficiency level in configurations where a resonance between the transmitter 204 and the receiver 208 is not matched.

A resonant frequency of the antenna 352 may be based on an inductance and a capacitance of the antenna 352. The inductance may be generated by the antenna 352. The capacitance may be added to the antenna 352 to create a resonant structure at a desired resonant frequency. In an exemplary embodiment, a capacitor 354 and a capacitor 356 may be added to the resonant circuit 350. The resonant circuit 350 may be configured to select a signal 358 at the resonant frequency. An amount of capacitance that may be required to sustain the resonant frequency may decrease as a diameter or an amount of inductance of the antenna 352 increases. A larger diameter antenna 352 may provide more efficient energy transfer than a smaller diameter antenna 352. Other embodiments may include different resonant circuits formed using other components. As another non-limiting example, a capacitor may be placed in parallel between the two terminals of the antenna 352. In an embodiment where antenna 352 is configured as the transmit antenna 214, the signal 358 may provide a frequency that substantially corresponds to the resonant frequency of the antenna 352.

Figure 4:
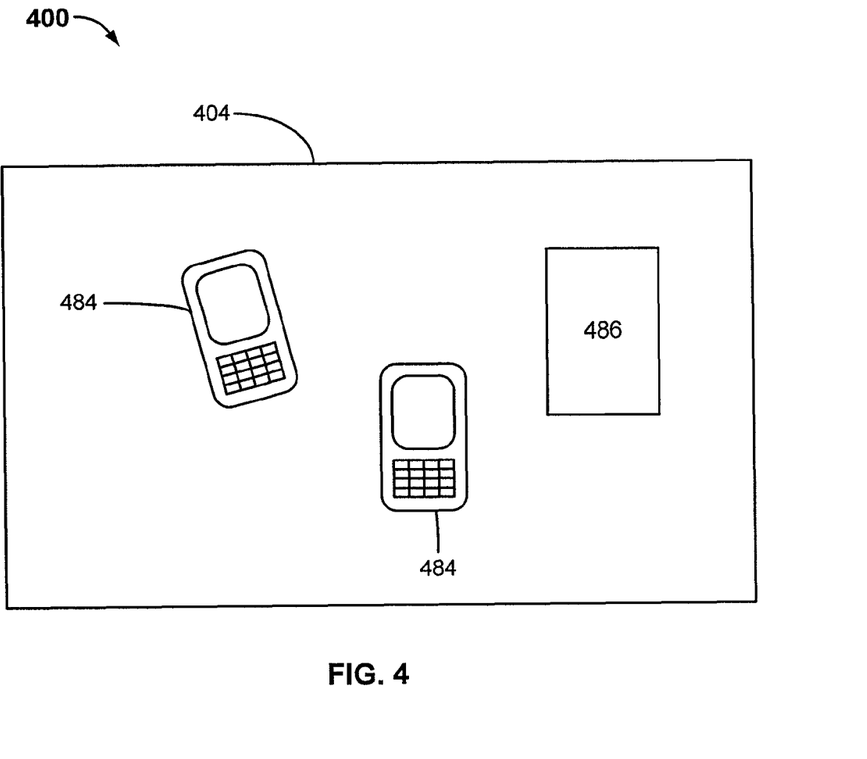
FIG. 4 illustrates a wireless power system including a wireless power transmitter, wireless power receivers, and a non-compliant object, in accordance with exemplary embodiments of the invention.

FIG. 4 illustrates a wireless power system 400 including a power transfer unit 404 ("PTU") (e.g., a power transfer unit that provides wireless charging), a power receive units 484 ("PRU") (e.g., power receive units that are wirelessly chargeable devices), and a non-compliant object 486, according to an exemplary embodiment of the invention. In some embodiments, the PTU 404 may be configured as the transmitter 204 of FIG. 2 and each of the PRUs 484 may be configured as the receiver 208 of FIG. 2. The PTU 404 may be configured to generate an energy field (e.g. the energy field 205 of FIG. 2) and the PRUs 484 may be configured to couple to the energy field generated by the PTU 404. In some embodiments the PTU 404 may be a wireless charging mat configured to charge a PRU positioned on top of, or near, the PTU 404.

As described above in reference to FIG. 2, the PRUs 484 may be configured to convert the energy received from energy field of the PTU 404 into electrical energy. In some embodiments, the PRUs 484 may include devices such as cellular phones, portable music players, computers, laptop computers, tablet computers, computer peripheral devices, communication devices (e.g., Bluetooth headsets), digital cameras, hearing aids (and other medical devices), etc. In some embodiments, the PRU 484 may be connected to a device to be charged which is configured to receive energy from the PRU 484. In other embodiments, the device to be charged may be integrated into the PRU 484. In some embodiments, the PRU 484 may be positioned on top of the PTU 404 (e.g. the wireless charging mat) and may receive power from the PTU 404.

In some embodiments, the wireless power system 400 may include one or more non-compliant objects 486 (or "non-compliant device," "foreign object," "rogue object," or "foreign device"). The non-compliant object 486 may comprise a damaged device, a device not built to the correct specifications, or any other metal object that couples to the magnetic field generated by the PTU 404 (e.g., jewelry, eye-glasses, key-chains, etc.). In some embodiments, the non-compliant object 486 may be an object or device that may not be configured to communicate with the PTU 404 and may not be configured to function according to a system control algorithm of the PTU 404. In this embodiment, the non-compliant object 486 may not be configured to notify the PTU 404 of an amount of the electrical energy consumed by the non-compliant object 486.

The non-compliant object 486 may not be configured to de-couple from the energy field. In a configuration where the PTU 404 is not configured to detect a non-compliant object 486, the PTU 404 may transfer power to the non-compliant object 486 indefinitely. In this configuration, the non-compliant object 486 may dissipate the received energy as heat, which may cause damage to the non-compliant object 486, cause a fire, injure a user of the PTU 404, damage the PTU 404, or cause other safety hazards.

In some embodiments, the PTU 404 may be configured to detect the non-compliant object 486 positioned within a coupling mode region of the PTU 404. In exemplary embodiments, the PTU 404 may be configured to continuously measure an amount of AC power transmitted by the PTU 404 and an impedance observed at the transmit antenna of the PTU 404. The amount of transmitted AC power may be determined based on a voltage, a current, and a phase offset between voltage and current measured at the PTU 404. The non-compliant object 486 may cause a shift in the impedance measured at the PTU 404 and the PTU 404 may be configured to detect the non-compliant object 486 based on the shift in impedance.

The PTU 404 may be further configured to detect the non-compliant object 486 based on the amount of transmitted power, an amount of power received by the PRUs 484, and an amount of power lost. The PTU 404 may be configured to receive signals from each of the PRUs 484 indicating the amount of power received by each of the PRUs 484. The PTU 404 may be configured to determine the amount of power transfer lost by determining a difference between the amount of power transmitted to PRUs 484 and the amount of power received by the PRUs 484. The amount of power transfer lost may be caused by an amount of power dissipated as heat and an amount of power received by the non-compliant object 486. The PTU 404 may be configured to detect the non-compliant object 486 by comparing an expected amount of power to be dissipated as heat to the amount of power transfer lost. The PTU 404 may be configured to detect the non-compliant object based on the amount of lost power being greater than a threshold for power transfer loss.

Figure 5:
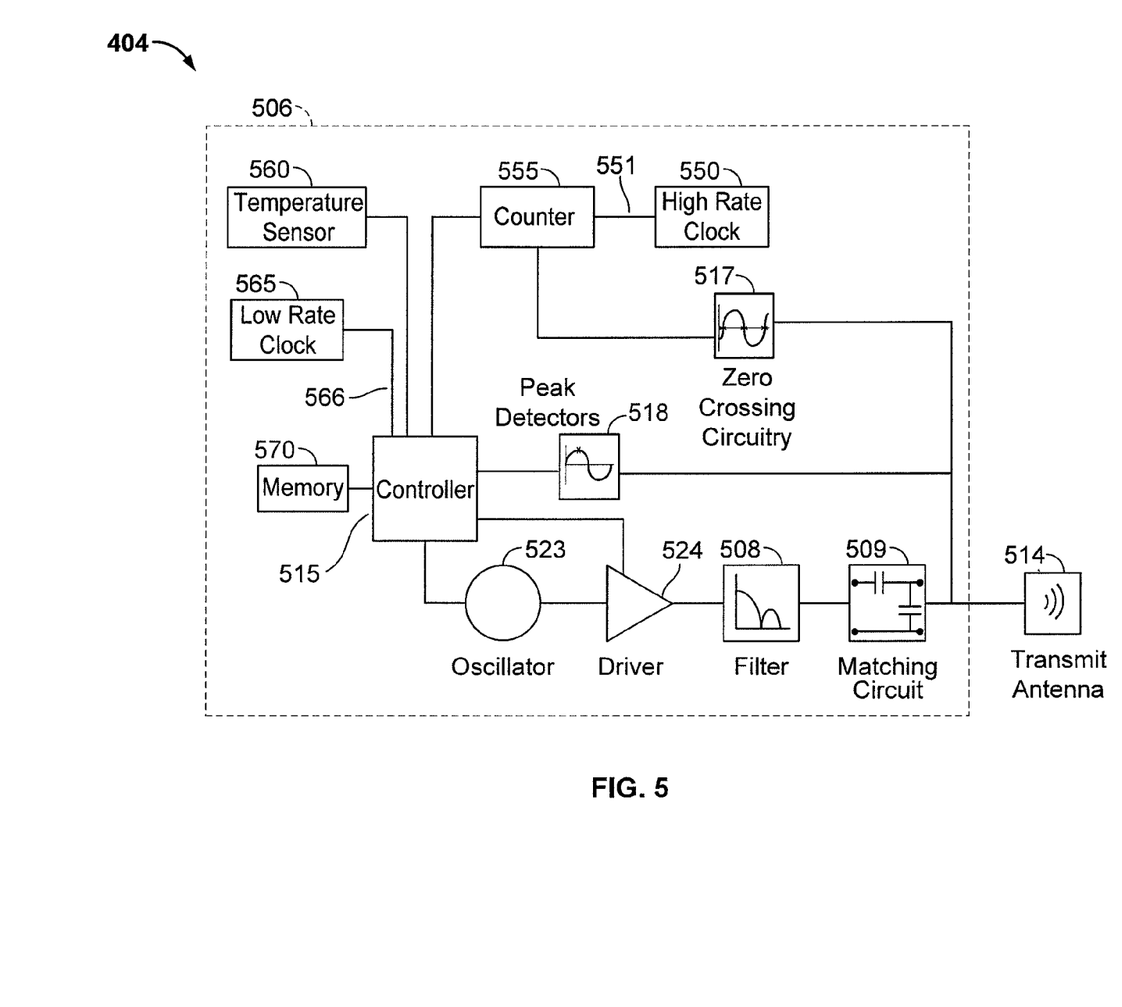
FIG. 5 is a functional block diagram of a transmitter that may be used in the wireless power transfer system of FIG. 4, in accordance with exemplary embodiments of the invention.

FIG. 5 is a functional block diagram of the PTU 404 of FIG. 4, in accordance with exemplary embodiments of the invention. The PTU 404 may include transmit circuitry 506 operably coupled to a transmit antenna 514. The transmit antenna 514 may be configured as the transmit antenna 214 as described above in reference to FIG. 2. In some embodiments, the transmit antenna 514 may be a coil (e.g., an induction coil). In other embodiments the transmit antenna 514 may be an RF antenna. In some embodiments, the transmit antenna 514 may be associated with a larger structure, such as a table, mat, lamp, or other stationary configuration. The transmit antenna 514 may be configured to generate an electromagnetic or magnetic field, hereinafter referred to as a "charging region," as described above. In an exemplary embodiment, the transmit antenna 514 may be configured to transmit power to a receiver device (e.g., the PRU 484) within the charging region at a power level sufficient to charge or power the receiver device.

The transmit circuitry 506 of the PTU 404 may receive power through a number of power sources (not shown). The transmit circuitry 506 may include various components configured to drive the transmit antenna 514. In some exemplary embodiments, the transmit circuitry 506 may be configured to adjust the transmission of wireless power based on the presence and constitution of the receiver devices as described herein. As such, the transmit circuitry 506 may provide wireless power efficiently and safely.

The transmit circuitry 506 may include a controller 515. In some embodiments, the controller 515 may be a micro-controller. In other embodiments, the controller 515 may be implemented as an application-specific integrated circuit (ASIC). The controller 515 may be operably connected, directly or indirectly, to each component of the transmit circuitry 506. The controller 515 may be further configured to receive information from each of the components of the transmit circuitry 506 and perform calculations based on the received information. The controller 515 may be configured to generate control signals for each of the components that may adjust the operation of that component. As such, the controller 515 may be configured to adjust the power transfer based on a result of the calculations performed by it.

The transmit circuitry 506 may include a memory 570 operably connected to the controller 515. The memory 570 may comprise random-access memory (RAM), electrically erasable programmable read only memory (EEPROM), flash memory, or non-volatile RAM. The memory 570 may be configured to temporarily or permanently store data for use in read and write operations performed by the controller 515. For example, the memory 570 may be configured to store data generated as a result of the calculations of the controller 515. As such, the memory 570 allows the controller 515 to adjust the transmit circuitry 506 based on changes in the data over time.

The transmit circuitry 506 may also include a low rate clock 565 operably connected to controller 515. The low rate clock 565 may include an oscillator capable of generating a clock signal 566 that may be stable under varying load and temperature conditions. The clock signal 566 of the low rate clock 565 may be provided to the controller 515 for use in synchronizing the calculations, signaling, and read/write operations of the controller 515. The low rate clock 565 may ensure the proper timing of the controller's 515 operations. In some embodiments, the low rate clock 565 may be integrated into the controller 515.

The transmit circuitry 506 may include an oscillator 523 operably connected to the controller 515. The oscillator 523 may be configured as the oscillator 222 as described above in reference to FIG. 2. The oscillator 523 may be configured to generate an oscillating signal (e.g., radio frequency (RF) signal) at the operating frequency of the wireless power transfer. In some exemplary embodiments, the transmit circuitry 506 of the PTU 404 may be configured to operate at the 6.78 MHz ISM frequency band. The controller 515 may be configured to selectively enable the oscillator 523 during a transmit phase (or duty cycle) of the PRU 484. The controller 515 may be further configured to adjust the frequency or a phase of the oscillator 523 which may reduce out-of-band emissions, especially when transitioning from one frequency to another. As described above, the transmit circuitry 506 may be configured to provide an amount of RF power to the transmit antenna 514 via the RF signal, which may generate energy (e.g., magnetic flux) about the transmit antenna 514.

The transmit circuitry 506 may include a driver circuit 524 operably connected to the controller 515 and the oscillator 523. The driver circuit 524 may be configured as the driver circuit 224 as described above in reference to FIG. 2. The driver circuit 524 may be configured to drive the RF signals received from the oscillator 523, as described above.

The transmit circuitry 506 may include a low pass filter (LPF) 508 operably connected to the transmit antenna 514. The low pass filter 508 may be configured as the filter portion of the filter and matching circuit 226 as described above in reference to FIG. 2. In some exemplary embodiments, the low pass filter 508 may be configured to receive and filter an analog signal of current and an analog signal of voltage generated by the driver circuit 524. In some embodiments, the low pass filter 508 may alter a phase of the analog signals. The low pass filter 508 may cause the same amount of phase change for both the current and the voltage, canceling out the changes. In some embodiments, the controller 515 may be configured to compensate for the phase change caused by the low pass filter 508. The low pass filter 508 may be configured to reduce harmonic emissions to levels that may prevent self-jamming of the PRUs 484. Other exemplary embodiments may include different filter topologies, such as notch filters that attenuate specific frequencies while passing others.

The transmit circuitry 506 may include a fixed impedance matching circuit 509 operably connected to the low pass filter 508 and the transmit antenna 514. The matching circuit 509 may be configured as the matching portion of the filter and matching circuit 226 as described above in reference to FIG. 2. The matching circuit 50 may be configured to match the impedance of the transmit circuitry 506 (e.g., 50 ohms) to the transmit antenna 514. Other exemplary embodiments may include an adaptive impedance match that may be varied based on measurable transmit metrics, such as the measured output power to the transmit antenna 514 or a DC current of the driver circuit 524. The transmit circuitry 506 may further comprise discrete devices, discrete circuits, and/or an integrated assembly of components.

In an exemplary embodiment, the transmit circuitry 506 may include peak detectors 518 operably connected to the transmit antenna 514 and the controller 515. The peak detectors 518 may be configured to receive the filtered signals of current and voltage generated by the low pass filter 508 and determine peak values for both current and voltage. The controller 515 may be configured to receive an analog signal indicating the peak values of current and voltage from the peak detectors 518 and convert the signals using an analog to digital (A/D) converter. The controller 515 may be configured to perform a linear transformation based on the converted peak values to determine a root mean squared (RMS) value for current and an RMS value for voltage. The controller 515 may be configured to continuously monitor the analog signals of the peak current and voltage and store data relating to the RMS values of current and voltage in the memory 570. The controller 515 may be configured to determine a level of power transmitted by the transmit antenna 514 and a level of impedance at the transmit antenna 514 based on the RMS values of current and voltage and a phase offset between the current and the voltage. The controller 515 may be further configured to enable or disable the oscillator 523 based on the levels of power and impedance. As such, the controller 515 may be configured to detect a presence or an absence of the PRUs 484, or the non-compliant device 486, based on the levels of power and impedance observed over time. The controller 515 may be configured to discontinue power transfer when the non-compliant 486 is present within a charging region of the PTU 404.

In an exemplary embodiment, the transmit circuitry 506 may include zero crossing circuitry 517 operably connected to the transmit antenna 514 and the controller 515. The zero crossing circuitry 517 may be configured to receive the filtered analog signals of current and voltage generated by the low pass filter 508, determine when the current and the voltage signals cross zero, and output signals indicating the zero crossings. An amount of time between the zero crossings of current and voltage may indicate the phase offset between the voltage and the current. As described above, the power and impedance at the transmit antenna 514 may be measured based on the current, the voltage, and the phase offset between the current and the voltage. A delay caused by the zero crossing circuitry 517 may apply equally to both the current and the voltage, canceling out the delay.

In an exemplary embodiment, the transmit circuitry 506 may include a high rate clock 550. The high rate clock 550 may comprise an independent oscillator (e.g. inverter gates in a ring oscillator configuration), a phase locked loop (PLL), or a frequency locked loop (FLL) multiplier. The PLL may be configured to up-convert the low rate clock signal 566. The high rate clock 550 may be configured to generate an oscillating clock signal 551 that oscillates at a frequency (i.e. rate) that is higher than the frequency of the clock signal 566 of the low rate clock 565. In embodiments where the high rate clock 550 is implemented using an oscillator, the rate of clock signal 551 may be related to the total propagation delay of the inverters. In an exemplary embodiments, the frequency of the clock signal 551 generated by the high rate clock 550 may be sufficient to determine the phase angle between the voltage and the current of the driver circuit 524 within a determined tolerance for error.

In an exemplary embodiment, the frequency F of the high rate clock 550 is determined based on an operating frequency O of the wireless power transfer between the PTU 404 and the PRU 484 (i.e. the frequency of the driver circuit 524) and a desired error tolerance threshold for power measurement in each quadrant E (in percentage). AC power may be measured based on the cosine of the phase angle φ. However, Cos(φ) is a non-linear function. As such, the error in measuring the power may be the greatest around 90° where the error is proportional to φ. Accounting for the worst case scenario, the frequency of the high rate clock 550 may be determined based the following equation:

$$F = O \times \frac{400}{E} \quad (1)$$

For example, in one exemplary embodiment, the desired error tolerance E may be 2% and the operating frequency O of the driver circuit 254 may be 6.78 MHz. In this example, the frequency F high rate clock 550 may be 1.356 GHz in order to achieve the desired error tolerance threshold of 2%. As shown above, the frequency of the clock signal 551 may increase as the operating frequency increases or as the error tolerance threshold decreases. The frequency of the clock signal 551 may decrease as the operating frequency decreases or as the error tolerance threshold increases. In some embodiments, the high rate clock 550 may be integrated into the controller 515.

In an exemplary embodiment, the transmit circuitry 506 may include a counter 555 operably connected to the high rate clock 550, the zero crossing circuitry 517, and the controller 515. In some embodiments, the counter 555 may comprise a double-buffer 16-bit counter. The counter 555 may be configured to receive the clock signal 551 of the high rate clock 550 and count the number of oscillations of the clock signal 551. The counter may be further configured to provide a counter value to the controller 515. The counter value may be stored in a register is that configured to be read by the controller 515. In some embodiments the counter 555 may be integrated into the controller 515. The counter 555 may be configured to enable/disable counting the clock signal 551 based on signals received from the zero crossing circuitry 517. In some embodiments, the zero crossing circuitry 517 may be configured to enable the counter 555 when the current equals zero and disable the counter 555 when the voltage equals zero (or vice versa). As such, the counter value of the counter 555 is based on the number of oscillations of the high rate clock 550 between the zero crossings of current and voltage. The controller 515 may be configured to determine the phase offset between the current and the voltage based on the counter value of the counter 555. As such, the counter 555 and the zero crossing circuitry 517 enable the controller 515 to measure the phase offset between voltage and current that may be used to determine the impedance. In some embodiments, the counter 555 may be integrated into the controller 515.

The high rate clock 550 may provide a higher degree of speed and accuracy in measuring the power and impedance at the PTU 404 than measurements based on the clock signal 566 of the low rate clock 565. For example, the low rate clock 565 may be slower (e.g. operating at 27.12 MHz) than the high rate clock 550 (e.g. 1 GHz). Power and impedance measurements based on the high rate clock 550 (e.g. 1 GHz) may be able to achieve a 2% error tolerance, which lower clock frequencies may degrade such accuracy.

In some embodiments, the controller 515 may be configured to calibrate the counter 555. The controller 515 may be configured to enable the counter 555 for a known amount of time (e.g. 50 ns), the known amount of time based on the clock signal 566 of the low rate clock 565, which may be stable. The controller 515 may be configured to repeat this procedure at intervals (e.g. once a second) to determine a variation in the clock frequency of the high rate clock 550 over time. In some exemplary embodiments, the transmit circuitry 506 may include a temperature sensor 560 operably connected to the controller 515. As described above, the frequency of the high rate clock 550 may depend on the total propagation delay of the inverter gates, which may depend on the temperature of the gates. The temperature sensor 560 may be configured measure a temperature of the high rate clock 550 and provide temperature data to the controller 515. The controller 515 may store the temperature information in the memory 570. As such, the controller 515 may be configured to calibrate the counter 555 based on the variation of the clock rate of the high rate clock 550 and the variation in the temperature. The controller 515 may be further configured to calibrate the counter 555 based on any other component of the PTU 404. The controller 515 may be further configured to store the calibration information in the memory 570 and calibrate the counter 555 based on the data over time.

As described above, the high rate clock 550 may provide improved power and impedance measurement. Improved measurement capabilities may be usefully utilized for assessing a proper operating point of the PTU 404. Another benefit of the high rate clock 550 is that it may provide improvements in the start of charging. For example, in some exemplary embodiments, the PTU 404 may be configured to perform power measurement within one AC cycle (i.e 0.14 µs). As such, a beacon signal of the PTU 404 may have a shorter duration. The shorter beacon signal may improve the time for the PTU 404 to discover the PRU 484 based on an impedance shift caused by positioning the PRU 484 close to the PTU 404. As such, a latency between the positioning of the PRU 484 for charging and the transfer of power is reduced. For example, the time length of the short beacon signal may equal to or less than the time required for the power amplifier 701 to generate a stable output. Accordingly, a shorter duration of short beacon may provide increased power efficiency.

Another benefit of this configuration is improved cross connection prevention. Cross connection may occur when the PRU 484 receives power from a PTU 404 other the PTU 404 it is positioned on, which may cause inefficient power usage. The PTU 404 may be configured to detect a PRU 484 positioned to receive power based on an impedance shift caused by the PRU 484. As such, improved impedance measurement accuracy at the PTU 404 may improve PRU 484 detection and prevent cross connections.

Another benefit of this configuration is improved power sharing implementation. As described above, the PTU 404 may be configured to charge multiple PRUs 484. However, in some instances, a sum of the rated powers of all PRUs 484 may exceed the amount of power that the PTU 404 is configured to transmit which may cause the PTU 404 to fault and stop charging. Therefore, improved capability to accurately measure power at the transmit antenna 514 of the PTU 404 may enable the PTU 404 to manage the amount of power transfer to prevent faults.

Figure 6:
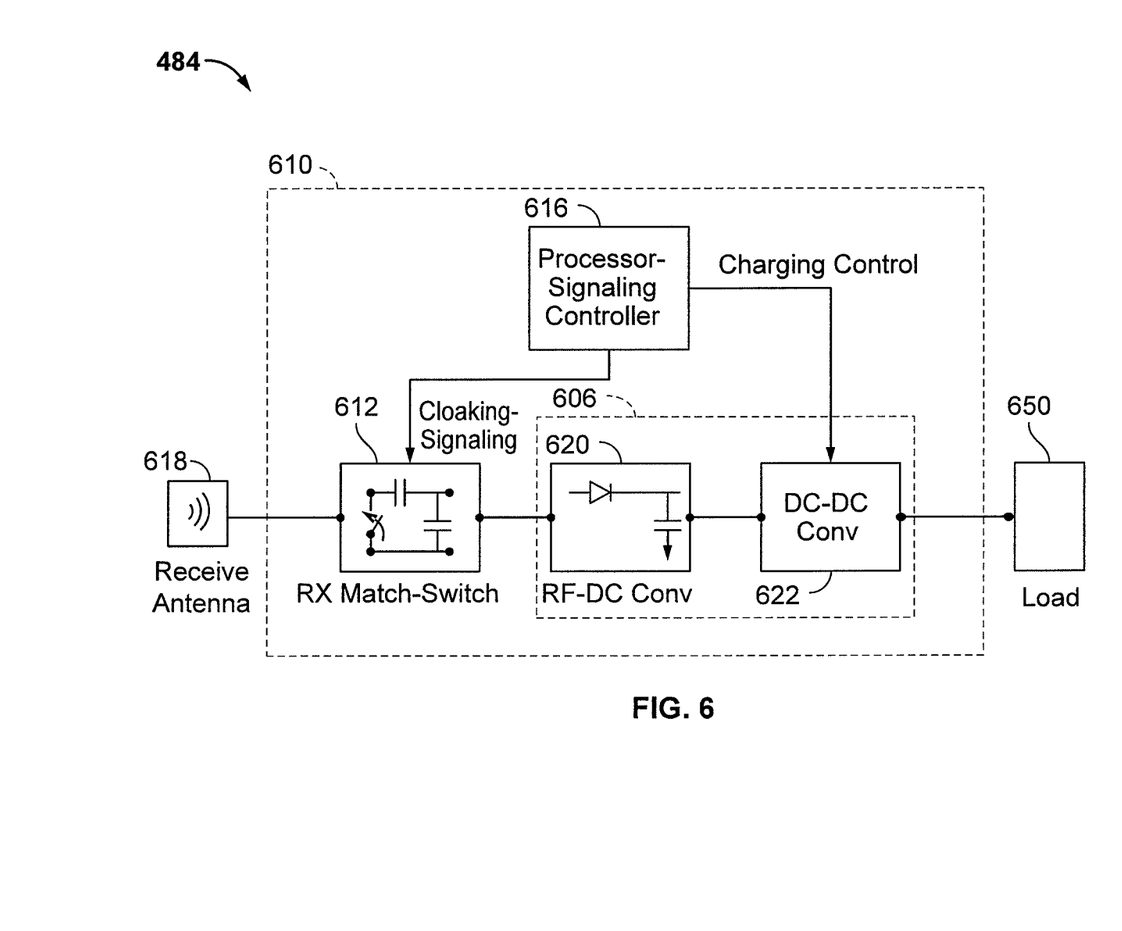
FIG. 6 is a functional block diagram of a receiver that may be used in the wireless power transfer system of FIG. 4, in accordance with exemplary embodiments of the invention.

FIG. 6 is a functional block diagram of the PRU 484 (as in FIG. 4), in accordance with exemplary embodiments of the invention. The PRU 484 may include a receive antenna 618, receive circuitry 610, and a load 650. The receive antenna 618 may be operably connected to the receive circuitry 610. The receive antenna 618 may be configured as the receive antenna 218 as described above in reference to FIG. 2. In some embodiments, the receive antenna 618 may be tuned to resonate at a frequency similar to a resonant frequency of the PTU 404, or within a specified range of frequencies, as described above. The receive antenna 618 may be configured to couple to the magnetic field generated by the PTU 404, as described above, and provide an amount of received energy to the receive circuitry 610 to power or charge the load 650.

The receive circuitry 610 may be operably coupled to the receive antenna 618 and the load 650. The receive circuitry may be configured as the receive circuitry 210 as described above in reference to FIG. 2. The receive circuitry 610 may be configured to match an impedance of the receive antenna 618, which may provide efficient reception of wireless power. The receive circuitry 610 may be configured to generate power based on the energy received from the receive antenna 618. The receive circuitry 610 may be configured to provide the generated power to the load 650. The PTU 484 may be configured to transmit a signal to the PTU 404 indicating an amount of power received from the PTU 404.

The receive circuitry 610 may include a processor-signaling controller 616 configured to coordinate the processes of the PRU 484 described below. The receive circuitry 610 may be configured to provide an impedance match to the receive antenna 618 to improve power transfer efficiency.

The receive circuitry 610 may include power conversion circuitry 606 for converting a received RF energy source into charging power for use by the load 650. The power conversion circuitry 606 may include an RF-to-DC converter 620 configured to rectify the RF energy signal received at the receive antenna 618 into a non-alternating power with an output voltage. The RF-to-DC converter 620 may comprise a partial or full rectifier, a regulator, a bridge, a doubler, a linear or switching converter, etc. The power conversion circuitry 606 may also include a DC-to-DC converter 622 (or other power regulator) configured to convert the rectified RF energy signal into an energy potential (e.g., voltage) that is compatible with the load 650.

The receive circuitry 610 may include switching circuitry 612 configured to connect or disconnect the receive antenna 618 to or from the power conversion circuitry 606. Disconnecting the receive antenna 618 from the power conversion circuitry 606 may suspend charging of the load 650 and/or change the "load" 650 as "seen" by the PTU 404.

The load 650 may be operably connected to the receive circuitry 610. The load may be configured as the battery 236 as described above in reference to FIG. 2. In some embodiments the load 650 may be external to the receive circuitry 610. In other embodiments the load 650 may be integrated into the receive circuitry 610.

Figure 7:
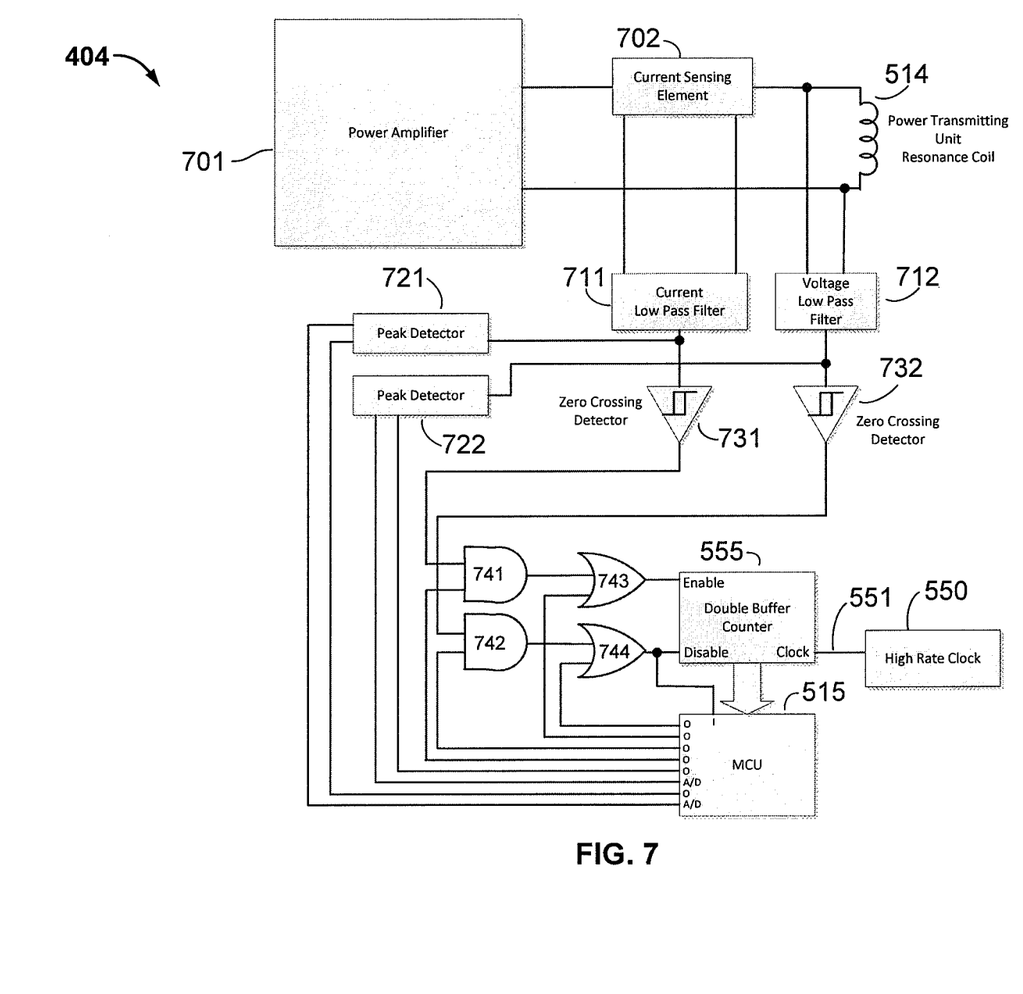
FIG. 7 illustrates a schematic diagram of an exemplary circuit implementing the transmitter of FIG. 5, in accordance with exemplary embodiments of the invention.

FIG. 7 illustrates a schematic diagram of the PTU 404 as described above in reference to FIG. 5, in accordance with exemplary embodiments of the invention. The PTU 404 may include the controller 515, the counter 555, the high rate clock 550, and the transmit antenna 514 as described above in reference to FIG. 5.

The PTU 404 may also include a power amplifier 701 operably connected to the transmit antenna 514 and configured to power the transmit antenna 514. The PTU 404 may also include a current sensing element 702 operably connected to the power amplifier 701 and the transmit antenna 514. The PTU 404 may also include a current low pass filter 711 operably connected to the current sensing element 702. The current low pass filter 711 may be configured to output a filtered signal indicating AC current. The PTU 404 may also include a voltage low pass filter 712 operably connected to the transmit antenna 514. The voltage low pass filter 712 may be configured to output a filtered signal indicating AC voltage. The low pass filters 711, 712 may alter the phase of their input signals. However, the change in phase for both the current and the voltage may be approximately equal, and thus, cancel each other out. The controller 515 may also calibrate the counter 555 based on the phase change caused by the low pass filters 711, 712.

The PTU 404 may also include a current peak detector 721 operably connected to the output of the current low pass filter 711. The current peak detector 721 may be configured to detect a peak value of the current. The PTU 404 may also include a voltage peak detector 712, operably connected to the voltage low pass filter 712, configured to detect a peak value of the voltage. The peak detectors 721, 722 may provide analog signals proportional to the size of the peak AC current and voltage to analog/digital (A/D) converters of the controller 515. In some embodiments, the A/D converters may be 8-bit A/D converters. The controller 515 may be operably connected to the peak detectors 721, 722 and may be configured to control the peak detectors 721, 722.

The PTU 404 may also include a current zero-crossing detector 731 operably connected to the current low pass filter 711. The current zero-crossing detector 731 may be configured to detect a zero-crossing of a sinusoidal wave of the current and generate a signal indicating the zero-crossing. The PTU 404 may also include a voltage zero-crossing detector 732 operably connected to the voltage low pass filter 712. The voltage zero crossing detector 732 may be configured to detect a zero crossing of a sinusoidal wave of the current.

The PTU 404 may also include a high rate clock 550. As described above with reference to FIG. 5, the high rate clock 550 may comprise an independent oscillator, a PLL, or an FLL. In some exemplary embodiments, the high rate clock 550 may produce a clock signal at about 1 GHz when a total delay of the NOR gates is about 1 ns.

The PTU 404 may include a counter 555 operably connected to the high rate clock 550, the current zero crossing detector, and the voltage zero crossing detector. In some embodiments, the counter 555 may be a double-buffer 16-bit counter. The counter 555 may be configured to write a counter value indicating a number of oscillations of the high rate clock signal 551 to a register. The register may be read by the controller 515 once the counter is disabled (i.e. stopped) and the counter value may be reset. The controller 515 may be configured to determine the phase offset between current and voltage based on the counter value. The controller may be further configured to determine whether current leads voltage, or whether voltage leads current, based on the counter value.

The PTU 404 may also include an AND gate 741 configured to receive, as inputs, the output of the current zero crossing detector 731 and an output of the controller 515. The PTU 414 may also include an AND gate 742 configured to receive, as inputs, the output of the voltage zero crossing detector 732 and an output of the controller 515. The controller 515 may be configured to allow or disallow the zero crossing detectors 731, 732 to enable and disable the counter 555 based on its outputs to the AND gates 741, 742. The controller 515 may disable the AND gates 741, 742 when it is preforming calibration operations.

The PTU 404 may also include an OR gate 743 configured to receive, as inputs, the output of the AND gate 741 and an output of the controller 515. The output of the OR gate 743 may be configured to enable the counter 555. The controller 515 may be configured to enable the enable counter 555 independent of the current zero crossing detector 731. The PTU 404 may also include an OR gate 744 configured to receive, as inputs, the output of the AND gate 742 and an output of the controller 515. The output of the OR gate 744 may be configured to disable the counter 555 independent of the voltage zero crossing detector 732. Accordingly, the controller 515 may enable and disable the counter 555 to perform calibration operations as described herein.

Furthermore, the configuration of FIG. 7 allows the PTU 404 to be implemented as an ASIC. Such an ASIC may comprise only decoupling capacitors in the low pass filters 711, 712 as discrete components.

Figure 8:
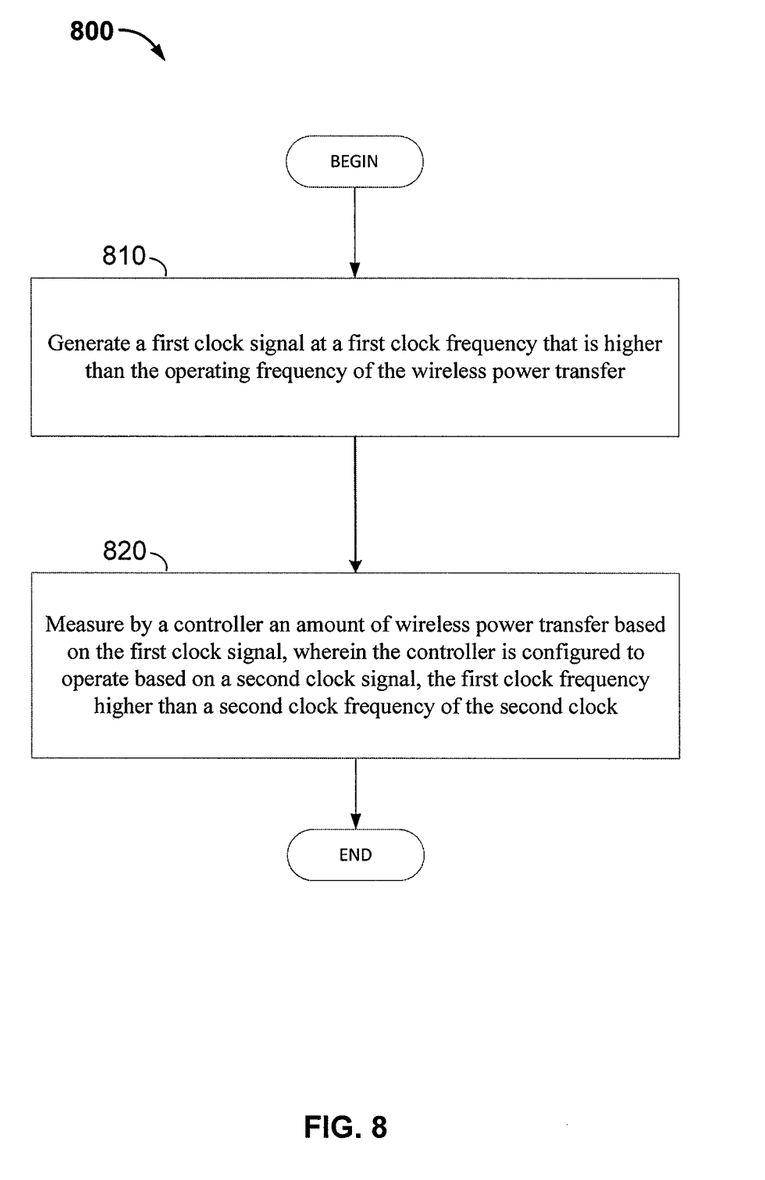
FIG. 8 is a flow chart of a method for measuring wireless power transfer, in accordance with exemplary embodiments of the invention.

FIG. 8 is a flow chart 800 of a method for measuring wireless power transfer, in accordance with exemplary embodiments of the invention. At block 810, the method may generate a first clock signal at a first clock frequency that is higher than the operating frequency of the wireless power transfer.

At block 820, the method may measure by a controller an amount of wireless power transfer based on the first clock signal, wherein the controller is configured to operate based on a second clock signal, the first clock frequency higher than a second clock frequency of the second clock.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations. For example, a means for selectively allowing current in response to a control voltage may comprise a first transistor. In addition, means for limiting an amount of the control voltage comprising means for selectively providing an open circuit may comprise a second transistor.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions may not be interpreted as causing a departure from the scope of the embodiments of the invention.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor may read information from, and write information to, the storage medium. In the alternative, the storage medium may be integral to the processor. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above may also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus for measuring wireless power transfer at an operating frequency between a transmitter and a receiver, the apparatus comprising:
   a first clock configured to generate a first clock signal at a first clock frequency;
   a current zero crossing detector configured to detect a zero crossing of a current of the wireless power transfer at a transmit antenna of the transmitter;
   a voltage zero crossing detector configured to detect a zero crossing of a voltage at the transmit antenna of the wireless power transfer; and
   a controller configured to operate based on a second clock signal, the first clock frequency different than a second clock frequency of the second clock signal, the controller further configured to determine a phase offset between the voltage and the current of the wireless power transfer by measuring an amount of time between the zero crossing of current and the zero crossing of voltage based on the first clock signal, and to measure an amount of wireless power transfer based on the first clock signal, the voltage, the current, and the phase offset.

2. The apparatus of claim 1, wherein the first clock frequency is selected to achieve an error tolerance threshold based on the operating frequency of the wireless power transfer and the first clock frequency is higher than the operating frequency of the wireless power transfer.

3. The apparatus of claim 1, further comprising a counter configured to count a number of oscillations of the first clock signal, wherein the controller is further configured to measure the amount of time between the zero crossing of current and the zero crossing of voltage based on the number of oscillations of the first clock signal.

4. The apparatus of claim 1, further comprising:
   a current low pass filter configured to filter the current;
   a current peak detector configured to receive the filtered current from the current low pass filter and detect a peak value of the filtered current;
   a voltage low pass filter configured to filter the voltage; and
   a voltage peak detector configured receive the filtered voltage from the voltage low pass filter and detect a peak value of the voltage, wherein the controller is further configured to determine a root mean square value for current based on the peak value of the current, determine a root mean square value for voltage based on the peak value of the voltage, and measure the amount of wireless power transfer and a level of impedance of the transmitter based on the root mean square value for current and the root mean square value for voltage.

5. The apparatus of claim 1, wherein the controller is further configured to determine an impedance at a transmit antenna of the transmitter based on the determined phase offset.

6. The apparatus of claim 1, wherein the first clock comprises a phase locked loop and wherein the controller is further configured to calibrate the first clock signal based on the second clock signal.

7. The apparatus of claim 1, wherein the controller is further configured to transmit a beacon signal to the receiver at a beacon frequency with a period not longer than an amount of time for a power amplifier of the transmitter to generate a stable output.

8. The apparatus of claim 1, wherein the first clock frequency of the first clock signal increases as an error tolerance threshold decreases, and wherein the first clock frequency of the first clock signal decreases as the operating frequency of the wireless power transfer increases.

9. The apparatus of claim 1, wherein the first clock frequency is higher than the second clock frequency.

10. A method for measuring wireless power transfer at an operating frequency between a transmitter and a receiver, the method comprising:
    generating a first clock signal at a first clock frequency;
    determining a phase offset between a voltage and a current of the wireless power transfer, wherein determining the phase offset comprises:
    detecting a zero crossing of the current; and
    detecting a zero crossing of the voltage, wherein determining the phase offset between the voltage and the current comprises measuring an amount of time between the zero crossing of current and the zero crossing of voltage based on the first clock signal; and
    measuring by a controller an amount of wireless power transfer based on the first clock signal, the voltage, the current, and the phase offset, wherein the controller is configured to operate based on a second clock signal, the first clock frequency different than a second clock frequency of the second clock.

11. The method of claim 10, wherein the first clock frequency is selected to achieve an error tolerance threshold based on the operating frequency of the wireless power transfer and the first clock frequency is higher than the operating frequency of the wireless power transfer.

12. The method of claim 1, further comprising counting a number of oscillations of the first clock signal, wherein measuring the amount of time between the zero crossing of current and the zero crossing of voltage is based on the number of oscillations of the first clock signal.

13. The method of claim 10, further comprising calibrating the first clock signal based on the second clock signal.

14. The method of claim 10, wherein the first clock frequency is higher than the second clock frequency.

15. An apparatus for measuring wireless power transfer at an operating frequency between a transmitter and a receiver, the apparatus comprising:
    means for generating a first clock signal at a first clock frequency;
    means for determining a phase offset between a voltage and a current of the wireless power transfer, wherein the determining means comprises:
    means for detecting a zero crossing of the current; and
    means for detecting a zero crossing of the voltage; and
    means for measuring an amount of time between the zero crossing of current and the zero crossing of voltage based on the first clock signal to determine the phase offset between the voltage and the current; and means for measuring an amount of wireless power transfer based on the first clock signal, the voltage, the current, and the phase offset, the measuring means configured to operate based on a second clock signal, the first clock frequency different than a second clock frequency of the second clock.

16. The apparatus of claim 15, wherein the first clock frequency is selected to achieve an error tolerance threshold based on the operating frequency of the wireless power transfer and the first clock frequency is higher than the operating frequency of the wireless power transfer.

17. The apparatus of claim 15, further comprising means for calibrating the first clock signal based on the second clock signal.

18. The apparatus of claim 15, wherein the first clock frequency is higher than the second clock frequency.

* * * * *